United States Patent
Lee et al.

(10) Patent No.: US 10,115,940 B2
(45) Date of Patent: Oct. 30, 2018

(54) RECHARGEABLE BATTERY

(71) Applicant: SAMSUNG SDI CO., LTD., Yongin-si, Gyeonggi-do (KR)

(72) Inventors: Chi-Young Lee, Yongin-si (KR); Myung-Jae Jang, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 397 days.

(21) Appl. No.: 14/863,475

(22) Filed: Sep. 24, 2015

(65) Prior Publication Data
US 2016/0276633 A1  Sep. 22, 2016

(30) Foreign Application Priority Data
Mar. 16, 2015 (KR) .......... 10-2015-0035940

(51) Int. Cl.
*H01M 2/02* (2006.01)
*H01M 2/08* (2006.01)
*H01M 2/04* (2006.01)

(52) U.S. Cl.
CPC .......... *H01M 2/08* (2013.01); *H01M 2/0473* (2013.01); *H01M 2/0426* (2013.01)

(58) Field of Classification Search
CPC ..... H01M 2/08; H01M 2/0473; H01M 2/0426
See application file for complete search history.

(56) References Cited

U.S. PATENT DOCUMENTS

2006/0083982 A1* 4/2006 Jung .................. H01M 2/22
                                                               429/164
2013/0255073 A1  10/2013 Hosokawa et al.

FOREIGN PATENT DOCUMENTS

JP        2013-211178 A      10/2013
WO   WO 2012/121468    *  9/2012  .............. H01M 2/34

* cited by examiner

*Primary Examiner* — Raymond Alejandro
(74) *Attorney, Agent, or Firm* — Lee & Morse, P.C.

(57) ABSTRACT

A rechargeable battery includes a cap plate which closes and seals an opening of a case. The cap plate includes a welded portion, an adhesive portion, and a separated portion. The welded portion is welded to the opening of the case. The adhesive portion is recessed in the welded portion by a thickness of the case, and is thicker than the welded portion to protrude inward. A lateral surface contacts an inner surface of the opening. The separated portion is connected to the adhesive portion, is further recessed in a thickness direction of the case, and is separated from the inner surface of the opening.

10 Claims, 9 Drawing Sheets

RECHARGEABLE BATTERY

CROSS-REFERENCE TO RELATED APPLICATION

Korean Patent Application No. 10-2015-0035940, filed on Mar. 16, 2015, and entitled: "Rechargeable Battery," is incorporated by reference herein in its entirety.

BACKGROUND

1. Field

One or more embodiments described herein relate to a rechargeable battery.

2. Description of the Related Art

Unlike a primary battery, a rechargeable battery can be charged and discharged. A low-capacity rechargeable battery is used in mobile phones, notebook computers, camcorders, and other small portable electronic devices. A high-capacity rechargeable battery may be used as a power source for driving motors of a hybrid or electric vehicle.

A rechargeable battery may include an electrode assembly to be charged and discharged, a case to hold the electrode assembly and an electrolyte solution, a cap plate to cover an opening of the case, and an electrode terminal connected to the electrode assembly and provided in the cap plate.

In order to provide the cap plate in the opening of the case, the case may include a step in the opening. The cap plate may be disposed in the step for welding in a vertical direction. Alternatively, the cap plate may include a step at a bottom surface and may be disposed in the opening of the case for welded in a horizontal direction.

However, because there is a thickness difference at a stepped portion of the case and because the case is thin at a portion contacting a lateral surface of the cap plate, cracks or other defects may occur after welding. For example, welding defects may occur when the case and the cap plate are welded together.

In addition, the cap plate has a lateral surface. It may be difficult for the overall circumference of the cap plate to contact an inner surface of the opening of the case at an area which corresponds to the step of the cap plate. Thus, controlling the welding depth may be difficult and high welding energy may be required. Also, a gas (e.g., hydrogen) generated while welding (e.g., Al welding) may not be controlled. As a result, pin holes may form on a welding surface. When this happens, the rechargeable battery may be susceptible to breaking at weak points where the cap plate and case are poorly welded.

SUMMARY

In accordance with one or more embodiments, a rechargeable battery includes an electrode assembly to be charged and discharged; a case including the electrode assembly; a cap plate closing and sealing an opening of the case; and an electrode terminal connected to the electrode assembly and provided in a terminal hole of the cap plate, wherein the cap plate includes: a welded portion welded to the opening of the case; an adhesive portion recessed in the welded portion by a thickness of the case, the adhesive portion thicker than the welded portion to protrude inward and having a lateral surface contacting an inner surface of the opening; and a separated portion connected to the adhesive portion, further recessed in a thickness direction of the case, and separated from the inner surface of the opening.

The welded portion may be on an end portion of the opening and may form a welding line in a lateral direction of the case. The adhesive portion and the separated portion may be alternately arranged along a circumference of an inner surface of the cap plate. The adhesive portion may be in corner portions where the cap plate has a shape of a rectangle. The adhesive portion may be at centers of long sides of the cap plate.

An inner surface of the opening of the case and a lateral surface of the separated portion may be separated from each other, and space may be set along with an extended inner surface of the welded portion. The adhesive portion and the welded portion may form a first step, and the separated portion and the welded portion may form a second step that is connected to the first step in a planar direction.

The opening of the case may include a step at an inner side that is lower than the end portion, and the welded portion may be on a step of the opening to form a weld line from above the case. The adhesive portion and the separated portion may be alternately arranged along a circumference of an inner surface of the cap plate. The adhesive portion may be in corner portions where the cap plate having a shape of a rectangle.

The adhesive portion may be at centers of long sides of the cap plate. An inner surface of the step of the opening and a lateral surface of the separated portion may be separated from each other, and a space may be set along with an extended inner surface of the welded portion.

In accordance with another embodiment, a cap plate for a rechargeable battery includes a welded portion welded to an opening of a case; an adhesive portion recessed in the welded portion by a thickness of the case, the adhesive portion thicker than the welded portion to protrude inward and having a lateral surface contacting an inner surface of the opening; and a separated portion connected to the adhesive portion, further recessed in a thickness direction of the case, and separated from the inner surface of the opening.

The welded portion may be on an end portion of the opening and forms a welding line in a lateral direction of the case. The adhesive portion and the separated portion may be alternately arranged along a circumference of an inner surface of the cap plate. The adhesive portion may be in corner portions where the cap plate has a shape of a rectangle. The adhesive portion may be at centers of long sides of the cap plate.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
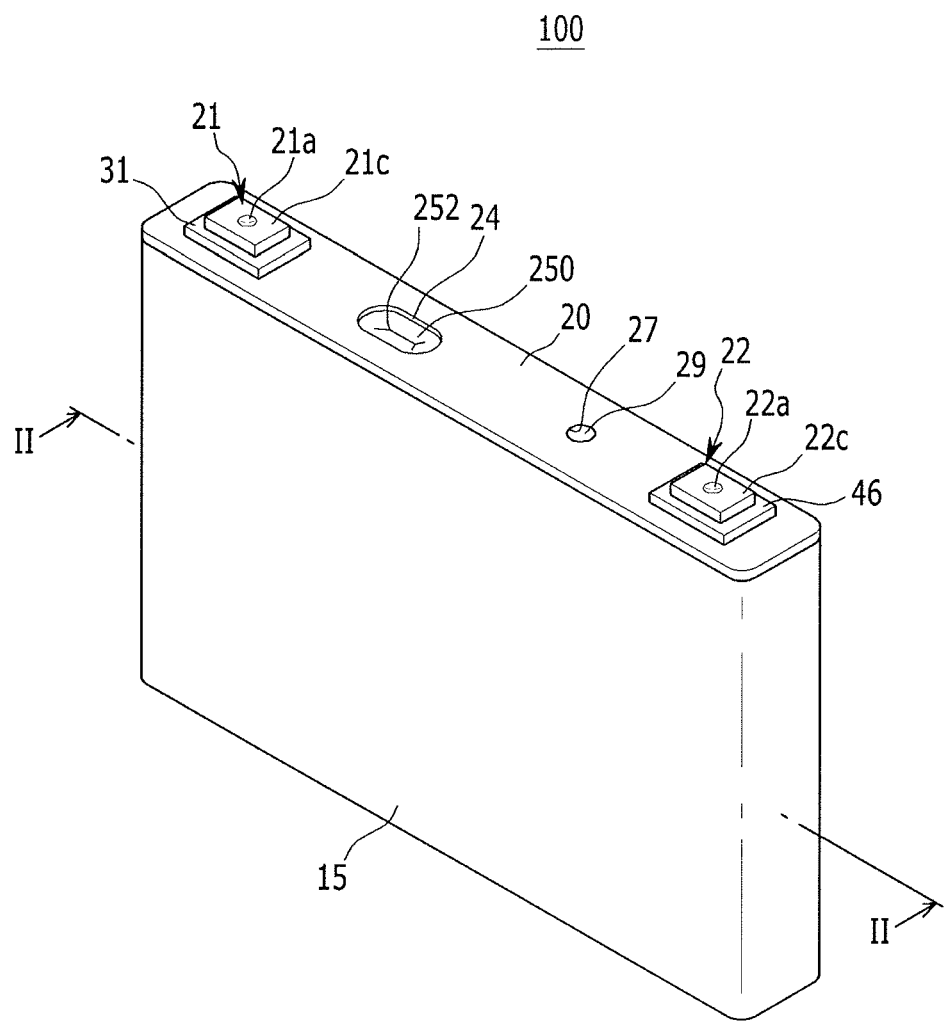
FIG. 1 illustrates an embodiment of a rechargeable battery.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
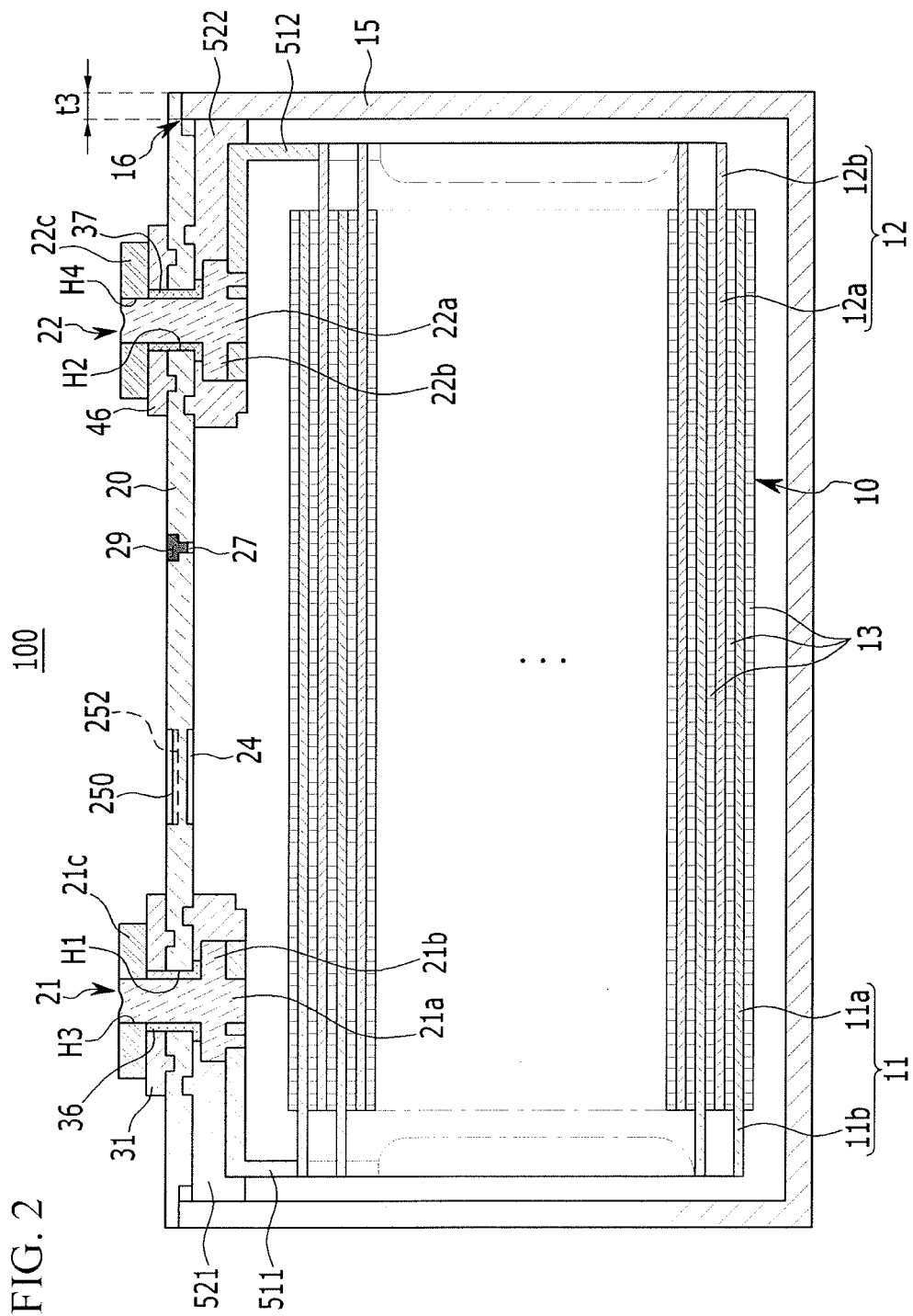
FIG. 2 illustrates a view along section line II-II in FIG. 1.

FIG. 1 illustrates an embodiment of a rechargeable battery 100, and FIG. 2 is a cross-sectional view of FIG. 1 taken along line II-II. Referring to FIGS. 1 and 2, the rechargeable battery 100 includes an electrode assembly 10 to be charged and discharged based on a current, a case 15 which includes the electrode assembly 10 and an electrolyte solution, a cap plate 20 for closing and sealing an opening 16 of the case 15, and first and second electrode terminals 21 and 22 in terminal holes H1 and H2 of cap plate 20.

The electrode assembly 10 may be formed, for example, by disposing first and second electrodes (e.g., negative and positive electrodes 11 and 12) at opposite surfaces of a separator 13, which serves as an insulator, and spirally winding the negative electrode 11, the separator 13, and the positive electrode 12 in a jelly-roll state.

Each of the negative and positive electrodes 11 and 12 includes coated regions 11a and 12a and uncoated regions 11b and 12b. The coated regions 11a and 12a include an active material coated on a current collector made of a thin metal plate. The uncoated regions 11b and 12b do not include an active material coated thereon and are formed as exposed current collectors.

The uncoated region 11b of the negative electrode 11 is formed at one end portion of the negative electrode 11 along the spirally wound negative electrode 11. The uncoated region 12b of the positive electrode 12 is formed at one end portion of the positive electrode 12 along the spirally wound positive electrode 12. In addition, the uncoated regions 11b and 12b are respectively disposed at opposite ends of the electrode assembly 10.

The case 15 may have, for example, a substantially cuboid shape to configure a space in which the electrode assembly 10 and an electrolyte solution are accommodated. The opening 16 of the case 15 is formed at one side of the cuboid, allowing the electrode assembly 10 to be inserted into an internal space from the outside.

The cap plate 20 is provided in the opening 16 of the case 15 to close and seal the opening 16. For example, the case 15 and the cap plate 20 may be welded to each other since they are made of aluminum. For example, after inserting the electrode assembly 10 into the case 15, the cap plate 20 may be welded to the opening 16 of the case 15.

The cap plate 20 may also include at least one opening, e.g., may include the terminal holes H1 and H2 and a vent hole 24. The first and second electrode terminals 21 and 22 are respectively provided in the terminal holes H1 and H2 of the cap plate 20 to be electrically coupled to the electrode assembly 10.

For example, the first and second electrode terminals 21 and 22 are respectively electrically coupled to the negative and positive electrodes 11 and 12. Accordingly, the electrode assembly 10 may be drawn out of the case 15 via the first and second electrode terminals 21 and 22. The first and second electrode terminals may be electrically coupled to the positive and negative electrodes of the electrode assembly.

The first and second electrode terminals 21 and 22 include rivet terminals 21a and 22a that are electrically coupled to the electrode assembly 10, provided to penetrate the terminal holes H1 and H2, to contact the plate terminals 21c and 22c disposed outside of the cap plate 20. The first and second electrode terminals 21 and 22 include or are fastened to the rivet terminals 21a and 22a.

The plate terminals 21c and 22c include through-holes H3 and H4. Upper ends of the rivet terminals 21a and 22a are inserted into the through-holes H3 and H4 by penetrating the terminal holes H1 and H2. The first and second electrode terminals 21 and 22 include flanges 21b and 22b that are formed integrally and widely from the rivet terminals 21a and 22a at an inner side of the cap plate 20.

An external insulating member 31 is interposed between the plate terminal 21c and the cap plate 20 near the first electrode terminal 21 connected to the negative electrode 11. The external insulating member 31 electrically insulates the plate terminal 21c from the cap plate 20. For example, the cap plate 20 continues to be electrically insulated from the electrode assembly 10 and the negative electrode 11.

By combining the insulating member 31 and the plate terminal 21c to an upper end of the rivet terminal 21a and then riveting or welding the upper end thereof, the insulating member 31 and the plate terminal 21c are fastened to the upper end of the rivet terminal 21a. The plate terminal 21c is provided outside the cap plate 20 with the insulating member 31 therebetween.

A conductive top plate 46 is interposed between the plate terminal 22c and the cap plate 20 near the second electrode terminal 22 connected to the positive electrode 12. The conductive top plate 46 electrically couples the plate terminal 22c with the cap plate 20. Thus, the cap plate 20 continues to be electrically coupled to the positive electrode 12 of the electrode assembly 10.

By combining the top plate 46 and the plate terminal 22c to an upper end of the rivet terminal 22a and then riveting or welding the upper end thereof, the top plate 46 and the plate terminal 22c are fastened to the upper end of the rivet terminal 22a. The plate terminal 22c is provided outside of the cap plate 20 to be electrically coupled to the cap plate 20, with the top plate 46 therebetween.

Gaskets 36 and 37 are respectively provided between the rivet terminals 21a and 22a of the first and second electrode terminals 21 and 22 and inner surfaces of the terminal holes H1 and H2 of the cap plate 20. The gaskets 36 and 37 provide a seal and electrical insulation between the rivet terminals 21a and 22a and the cap plate 20.

The gaskets 36 and 37 extend between the flanges 21b and 22b and an inner surface of the cap plate 20, to thereby further seal and provide electrical insulation between the flanges 21b and 22b and the cap plate 20. For example, the gaskets 36 and 37 may prevent the electrolyte solution from leaking via the terminal holes H1 and H2 along with the first and second electrode terminals 21 and 22 in the cap plate 20.

Lead tabs 511 and 512 respectively electrically couple the first and second electrode terminals 21 and 22 with the uncoated regions 11b and 12b of the negative and positive electrodes 11 and 12 of the negative and positive electrodes 11 and 12 of the electrode assembly 10. For example, by combining the lead tabs 511 and 512 to lower ends of the rivet terminals 21a and 22a and then caulking the lower ends thereof, the lead tabs 511 and 512 are supported by the flanges 21b and 22b and are connected to the lower ends of the rivet terminals 21a and 22a.

Internal insulating members 521 and 522 are respectively provided between the lead tabs 511 and 512 and the cap plate 20 to electrically insulate the lead tabs 511 and 512 from the cap plate 20. In addition, one side of each of the insulating members 521 and 522 is combined to the cap plate 20 while the other side thereof encloses the lead tabs 511 and 512, the rivet terminals 21a and 22a, and the flanges 21b and 22b, thereby stabilizing a connecting structure therebetween.

In addition, the cap plate 20 includes an electrolyte injection opening 27. After the cap plate 20 is combined to the case 15 and welded thereto, the electrolyte injection opening 27 allows the electrolyte solution to be injected into the case 15. After injecting the electrolyte solution, the electrolyte injection opening 27 is sealed by a sealing cap 29.

The vent hole 24 is configured to discharge internal pressure and a generated gas of the rechargeable battery 100, and is closed and sealed by a vent plate 250. The vent plate 250 is integrally formed with the cap plate 20 in the vent hole 24 and includes a notch 252 that induces a rupture.

Figure 3:
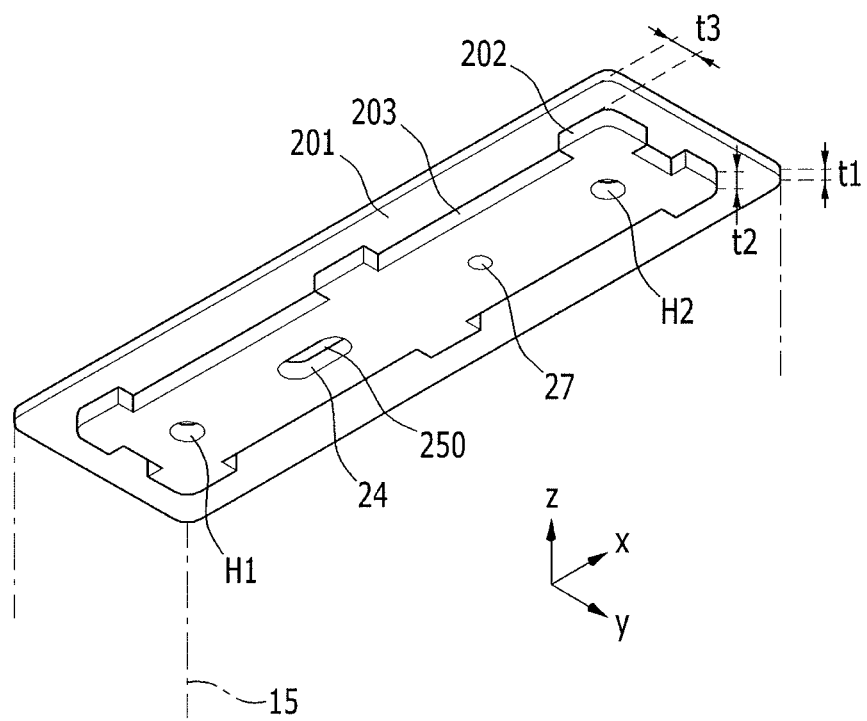
FIG. 3 illustrates an embodiment of a cap plate.
Figure 4:
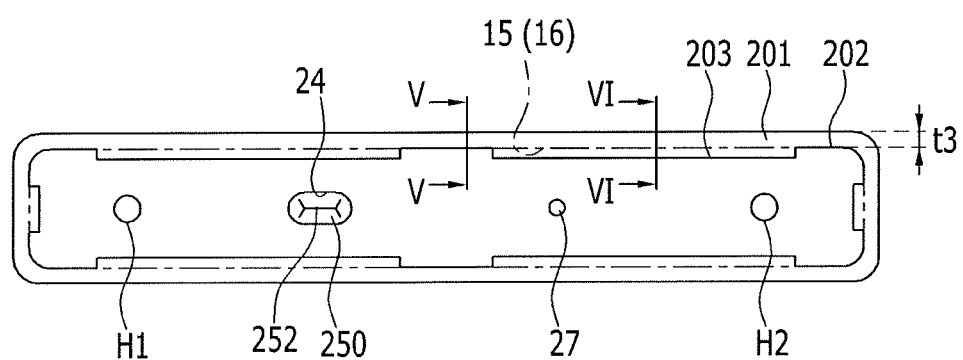
FIG. 4 illustrates another view of the cap plate.

FIG. 3 is a perspective view of one embodiment of the cap plate 20 in FIG. 2 viewed from the bottom. FIG. 4 is a top plan view of the cap plate 20 in FIG. 3. For ease of description, an adhesive portion 202 and a separated portion 203 are illustrated as solid lines, even though the inner surface of the cap plate 20 is illustrated.

The cap plate 20 includes a welded portion 201 formed at the opening 16 of the case 15, the adhesive portion 202 with a lateral surface contacting an inner surface 163 of the opening 16 (refer, e.g., to FIGS. 5 and 6), and the separated portion 203 separated from the inner surface 163 of the opening 16. When the cap plate 20 is welded to the case 15, the welded portion 201 is formed in an end portion 161 of the opening 16 of the case 15 (refer, e.g., to FIGS. 5 and 6).

The adhesive portion 202 is recessed in the welded portion 201 by a thickness t3 of the case 15 (refer, e.g., to FIG. 2), and is formed to protrude inward of the case 15 by a thickness that is greater than that of the welded portion 201. When the cap plate 20 is placed in the opening 16 to be welded thereto, the welded portion 201 is disposed in the end portion 161 of the opening 16. In this instance, the adhesive portion 202 contacts the inner surface 163 of the end portion 161 to fix the cap plate 20 to the opening 16 such that the cap plate 20 is prevented from being moved (refer, e.g., to FIG. 5).

The separated portion 203 is connected to the adhesive portion 202 along the circumference of the cap plate 20, and is recessed further in a direction of the thickness t3 of the case 15 such that it is formed to have the same thickness as the adhesive portion 202. When the cap plate 20 is placed in the opening 16, the adhesive portion 202 contacts the inner surface 163 of the opening 16 (refer, e.g., to FIG. 5), and the separated portion 203 does not contact the inner surface 163 of the opening 16 (refer, e.g., to FIG. 6), thereby making it easier to install the cap plate 20 in the opening 16 of the case 15.

The cap plate 20 is formed to have a first thickness t1 in the welded portion 201 and a second thickness t2 in the adhesive portion 202 and the separated portion 203. The separated portion 203 may be formed to a thickness that substantially corresponds to a sum of the first thickness t1 of the welded portion 201 and the second thickness t2.

For example, since the welded portion 201 of the thin and uniform first thickness t1 is disposed in the end portion 161 of the opening 16 and is then welded laterally to the case 15, only the adhesive portion 202 formed in a minimum range affects a welding bead. The separated portion 203 formed in the greater range does not affect the welding bead. Accordingly, welding quality may be improved.

The welded portion 201 and the end portion 161 of the opening 16 are welded while contacting the adhesive portion 202 of the second thickness t2, that is thicker than the welded portion 201, with the inner surface 163 of the opening 16. The separated portion 203 connected to the adhesive portion 202 is separated from the inner surface 163 of the opening 16. Thus, the welding depth may be controlled and welding energy may be decreased.

For example, only the adhesive portion 202 formed in the minimum range affects the welding depth and the welding energy. The separated portion 203 formed in most of the range does not affect the welding depth and the welding energy. Accordingly, the welding depth and the welding energy may be more easily controlled.

The adhesive portion 202 and the separated portion 203 are alternately arranged along the circumference of the inner surface of the cap plate 20. The adhesive portion 202 is disposed, as illustrated, in corner portions where the cap plate 20 is formed as a rectangle. This may prevent corner portions of the cap plate 20 from penetrating into the case 15 at corners of the opening 16.

In addition, the adhesive portion 202 may be disposed at centers of long sides of the cap plate 20, so that the long sides of the cap plate 20 are prevented from being separated from long sides of the opening 16. When the long sides of the cap plate are shortened, the adhesive portion may not be provided at the centers of the long sides.

Figure 5:
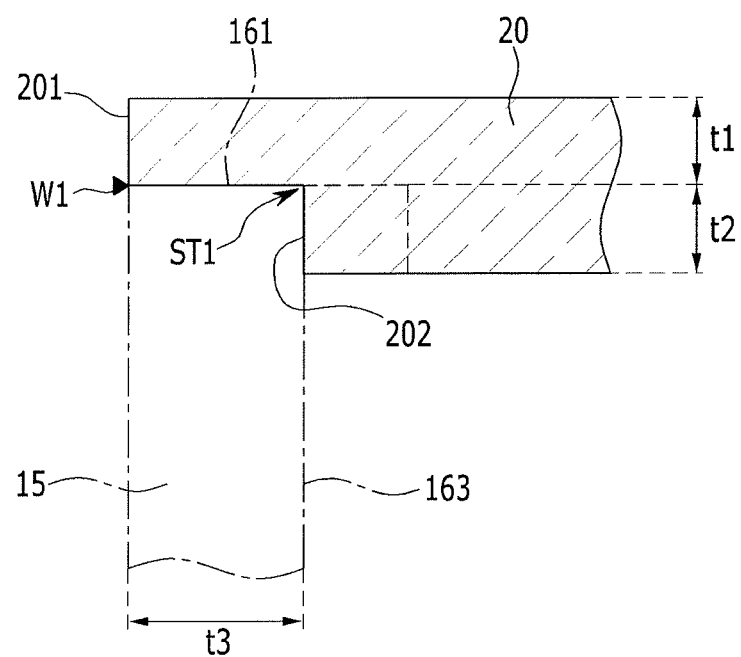
FIG. 5 illustrates a view along section line V-V in FIG. 4.
Figure 6:
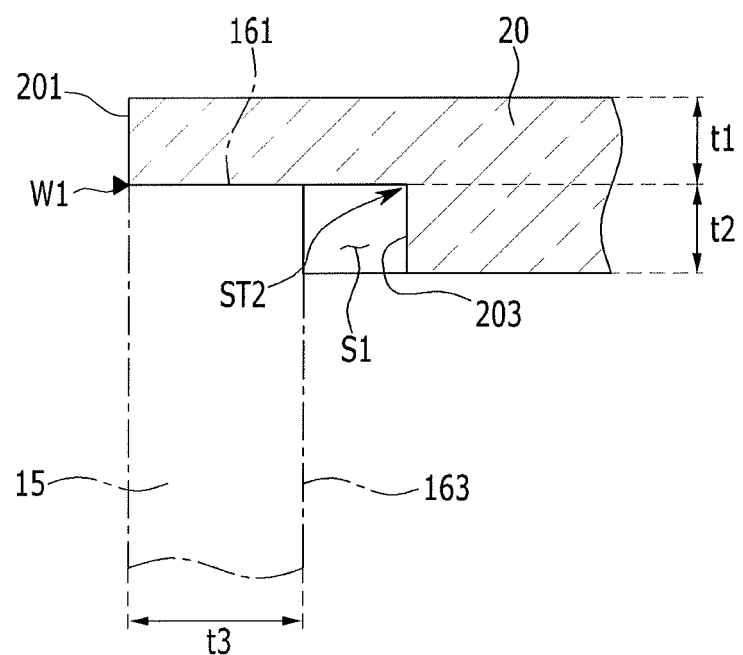
FIG. 6 illustrates a view along section line VI-VI in FIG. 4.

FIG. 5 is a cross-sectional view of FIG. 4 taken along the line V-V, and FIG. 6 is a cross-sectional view of FIG. 4 taken along the line VI-VI. Referring to FIGS. 5 and 6, in the cap plate 20, the adhesive portion 202 and the welded portion 201 form a first step ST1. The separated portion 203 and the welded portion 201 form a second step ST2 connected to the first step ST1 in a planar direction.

The first step ST1 allows the welded portion 201 to be disposed in the end portion 161 of the opening 16, and allows the adhesive portion 202 to contact the inner surface 163 of the opening 16. The second step ST2 allows movement of the gas, generated between the inner surface 163 of the opening 16 and the separated portion 203, while welding.

The welded portion 201 is on the end portion 161 of the opening 16 and forms a weld line W1 in a lateral direction of the case 15. In this instance, the inner surface 163 of the opening 16 of the case 15 and the lateral surface of the separated portion 203 are separated from each other, and form a space S1 along with an extended inner surface of the welded portion 201 (refer, e.g., to FIG. 6). The space S1 may introduce the gas generated while welding into the opening 16 of the case 15 to prevent pin holes from being generated in the welded portion, thereby improving welding quality.

Figure 7:
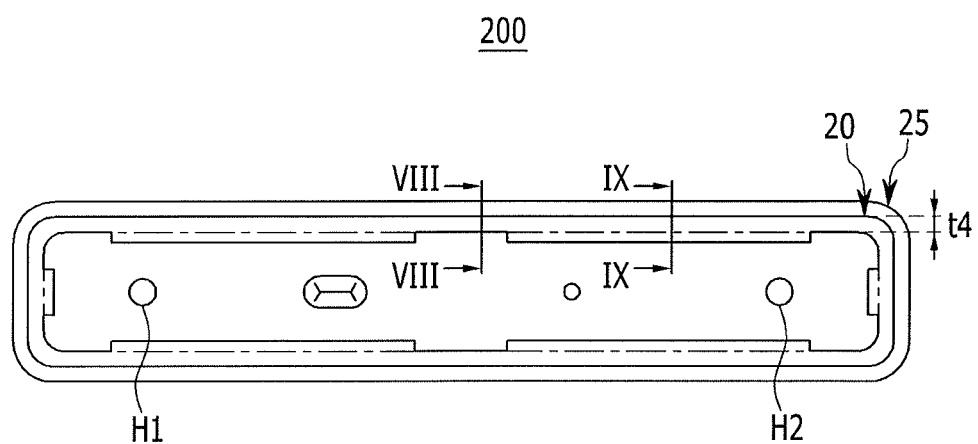
FIG. 7 illustrates another embodiment of a rechargeable battery.
Figure 8:
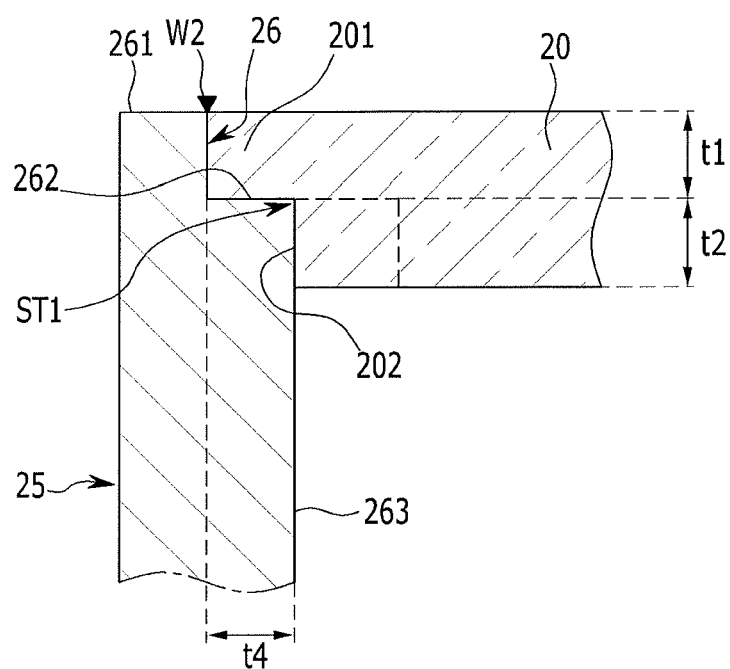
FIG. 8 illustrates a view along section line VIII-VIII in FIG. 7.

FIG. 7 is a top plan view illustrating another embodiment of a rechargeable battery 200 in which an electrode terminal is omitted and a cap plate is combined to a case. FIG. 8 illustrates a cross-sectional view of FIG. 7 taken along the line VIII-VIII, and FIG. 9 is a cross-sectional view of FIG. 7 taken along the line IX-IX.

Figure 9:
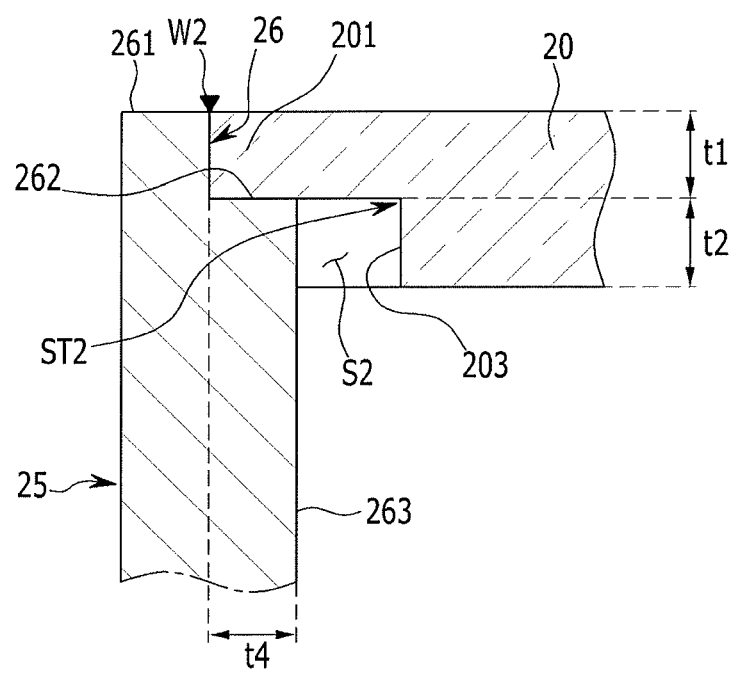
FIG. 9 illustrates a view along section line IX-IX in FIG. 7.

Referring to FIGS. 7 to 9, in the rechargeable battery 200, an inner side of an opening 26 of a case 25 is formed with a step 262 that is lower than an end portion 261. An adhesive portion 202 and a separated portion 203 are alternately arranged along a circumference of an inner surface of a cap plate 20. The adhesive portion 202 is disposed in corner portions where the cap plate 20 is formed as a rectangle, and may be further disposed at centers of long sides of the cap plate 20. When the cap plate 20 is welded to the case 25, a welded portion 201 is formed in the step 262 of the opening of the case 25 (refer, e.g., to FIGS. 8 and 9).

The adhesive portion 202 is recessed in the welded portion 201 by a thickness t4 of the step 262 of the case 25 (refer, e.g., to FIG. 7), and is formed to protrude with a greater thickness than the welded portion 201 inward of the case 25. The welded portion 201 is disposed in the step 262 of the opening 26 when the cap plate 20 is placed in the step 262 of the opening 26. In this instance, the adhesive portion 202 contacts an inner surface 263 of the step 262 and fixes the cap plate 20 to the step 262 of the opening 26, thereby preventing the cap plate from being moved (refer, e.g., to FIG. 8).

The separated portion 203 is connected to the adhesive portion 202 along the circumference of the cap plate 20, and is further recessed in a direction of the thickness t4 of the step 262 of the case 25 to have the same thickness as the adhesive portion 202. When the cap plate 20 is placed in the step 262 of the opening 26, the adhesive portion 202 contacts the inner surface 263 of the step 262 of the opening 26 (refer, e.g., to FIG. 8), and the separated portion 203 is made to not contact the inner surface 263 of the step 262 of the opening 26. Thus, the cap plate 20 may be easily installed in the step 262 of the opening 26 of the case 25 (refer, e.g., to FIG. 9).

The cap plate 20 is formed to have a first thickness t1 in the welded portion 201 and to have a second thickness t2 in the adhesive portion 202 and the separated portion 203. For example, since the welded portion 201 of the thin and uniform first thickness t1 is disposed in the step 262 of the opening 26 and is then welded from above the case 25, only the adhesive portion 202 formed in a minimum range affects a welding bead. The separated portion 203 formed in a greater range does not affect the welding bead. Accordingly, welding quality may be improved.

Thus, the welded portion 201 and the step 262 of the opening 26 are welded. The adhesive portion 202 of the second thickness t2 that is thicker than the welded portion 201 is made to contact the inner surface 263 of the step 262 of the opening 26. The separated portion 203 connected to the adhesive portion 202 is separated from the inner surface 263 of the step 262 of the opening 26. As a result, the welding depth may be controlled and welding energy may be decreased.

For example, only the adhesive portion 202 formed in the minimum range may affect the welding depth and the welding energy. The separated portion 203 formed in the greater range may not affect the welding depth and welding energy. Accordingly, the welding depth and the welding energy may be more easily controlled.

The adhesive portion 202 and the separated portion 203 are alternately arranged along the circumference of the inner surface of the cap plate 20. The adhesive portion 202 is disposed, as illustrated, in corner portions where the cap plate 20 is formed as a rectangle to prevent the corner portions of the cap plate 20 from penetrating into the case 25 at corners of the step 262 of the opening 26.

In addition, the adhesive portion 202 may be disposed at centers of long sides of the cap plate 20 to prevent the long side of the step 262 of the opening 26 from being separated from long sides of the cap plate 20. When the long sides of the cap plate are shortened, the adhesive portion may not be provided at the centers of the long sides.

The first step ST1 allows the welded portion 201 to be disposed in the step 262 of the opening 26, and allows the adhesive portion 202 to contact the inner surface of the opening 26 connected to the step 262. The second step ST2 allows movement of a gas, generated between the inner surface 263 of the opening 26 connected to the step 262 and the separated portion 203, while welding.

The welded portion 201 is disposed on the step 262 of the opening 26, and forms a welding line W2 in a lateral direction of the case 25. In this instance, in the case 26, the inner surface 263 of the step 262 of the opening 26 and a lateral surface of the separated portion 203 are separated from each other, and a space S2 may be set along with an extended inner surface of the welded portion 201 (refer, e.g., to FIG. 9)

The space S2 introduces the gas generated while welding into the step 262 of the opening 26 of the case 25, in order to prevent pinholes from being generated in the welded portion. This may improve welding quality.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A rechargeable battery, comprising:
   an electrode assembly to be charged and discharged;
   a case including the electrode assembly;
   a cap plate closing and sealing an opening of the case; and
   an electrode terminal connected to the electrode assembly and provided in a terminal hole of the cap plate,
   wherein the cap plate includes:
   a welded portion on an inner surface of the cap plate facing the electrode assembly and welded to the opening of the case;
   an adhesive portion on the inner surface of the cap plate and recessed in a lateral direction relative to an edge of the cap plate, the adhesive portion recessed to accommodate the welded portion by a thickness of the case, the adhesive portion thicker than the welded portion to protrude inward and having a lateral surface contacting an inner surface of the opening; and
   a separated portion on the inner surface of the cap plate and connected to the adhesive portion in the lateral direction, further recessed in a thickness direction of the case, and separated from the inner surface of the opening, wherein the welded portion is on an end portion of the opening and forms a welding line in a lateral direction of the case, the adhesive portion and the welded portion form a first step, and the separated portion and the welded portion form a second step that is connected to the first step in a planar direction.

2. The rechargeable battery as claimed in claim 1, wherein the adhesive portion and the separated portion are alternately arranged along a circumference of an inner surface of the cap plate.

3. The rechargeable battery as claimed in claim 2, wherein the adhesive portion is in corner portions where the cap plate has a shape of a rectangle.

4. The rechargeable battery as claimed in claim 3, wherein the adhesive portion is at centers of long sides of the cap plate.

5. The rechargeable battery as claimed in claim 4, wherein:

an inner surface of the opening of the case and a lateral surface of the separated portion are separated from each other, and a space is set along with an extended inner surface of the welded portion.

6. The rechargeable battery as claimed in claim 1, wherein:

the opening of the case includes a step at an inner side that is lower than the end portion, and the welded portion is on a step of the opening to form a weld line from above the case.

7. The rechargeable battery as claimed in claim 6, wherein the adhesive portion and the separated portion are alternately arranged along a circumference of an inner surface of the cap plate.

8. The rechargeable battery as claimed in claim 7, wherein the adhesive portion is in corner portions where the cap plate having a shape of a rectangle.

9. The rechargeable battery as claimed in claim 8, wherein the adhesive portion is at centers of long sides of the cap plate.

10. The rechargeable battery as claimed in claim 9, wherein:

an inner surface of the step of the opening and a lateral surface of the separated portion are separated from each other, and a space is set along with an extended inner surface of the welded portion.

* * * * *